US008880898B2

(12) United States Patent
Smeets

(10) Patent No.: US 8,880,898 B2
(45) Date of Patent: Nov. 4, 2014

(54) ANTI-ROLL-BACK MECHANISM FOR COUNTER

(75) Inventor: Ben Smeets, Dalby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1514 days.

(21) Appl. No.: 12/298,220

(22) PCT Filed: Apr. 18, 2007

(86) PCT No.: PCT/EP2007/003389
§ 371 (c)(1),
(2), (4) Date: Oct. 23, 2008

(87) PCT Pub. No.: WO2007/121903
PCT Pub. Date: Nov. 1, 2007

(65) Prior Publication Data
US 2009/0100272 A1    Apr. 16, 2009

Related U.S. Application Data

(60) Provisional application No. 60/747,676, filed on May 19, 2006.

(30) Foreign Application Priority Data

Apr. 24, 2006 (EP) .................................. 06388031

(51) Int. Cl.
*G06F 11/30* (2006.01)
*G06F 12/14* (2006.01)
*G06F 21/64* (2013.01)
*G06F 21/57* (2013.01)
*G06F 21/12* (2013.01)
*G06F 21/62* (2013.01)

(52) U.S. Cl.
CPC .............. *G06F 21/121* (2013.01); *G06F 21/64* (2013.01); *G06F 2221/2105* (2013.01); *G06F 21/57* (2013.01); *G06F 21/572* (2013.01); *G06F 21/6209* (2013.01)
USPC ........... 713/189; 713/190; 713/191; 713/192; 713/193; 726/27; 726/28; 726/29; 726/30; 726/31; 380/247; 380/248; 380/249; 380/250

(58) Field of Classification Search
CPC ... G06F 21/126; G06F 21/121; G06F 21/572; G06F 21/6209; G06F 21/64
USPC ....................................................... 713/189
See application file for complete search history.

(56) References Cited

U.S. PATENT DOCUMENTS

2003/0097578 A1    5/2003   England et al.
2004/0039924 A1 *  2/2004   Baldwin et al. ............... 713/189
(Continued)

FOREIGN PATENT DOCUMENTS

EP    1429224 A    6/2004

*Primary Examiner* — Arvin Eskandarnia

(57) ABSTRACT

A method of maintaining a version counter indicative of a version of memory content stored in a processing device. The method comprises selectively operating the device in a first or second mode. Access to the first mode is limited to authorized users and controlled separately from access to the second mode. In the first mode at least an initial integrity protection value is generated for cryptographically protecting an initial counter value of said version counter during operation of the processing device in the second mode; wherein the initial counter value is selected from a sequence of counter values, and the initial integrity protection value is stored as a current integrity protection value in a storage medium. In the second mode, a current counter value is incremented to a subsequent counter value; wherein incrementing includes removing the current integrity protection value from said storage medium.

34 Claims, 2 Drawing Sheets

(56) References Cited

U.S. PATENT DOCUMENTS

| | | | |
|---|---|---|---|
| 2004/0177261 A1* | 9/2004 | Watt et al. | 713/193 |
| 2005/0021968 A1* | 1/2005 | Zimmer et al. | 713/176 |
| 2005/0091516 A1* | 4/2005 | Mcdermott | 713/189 |
| 2005/0120242 A1* | 6/2005 | Mayer et al. | 713/201 |
| 2006/0004649 A1* | 1/2006 | Singh | 705/37 |
| 2006/0129848 A1* | 6/2006 | Paksoy et al. | 713/193 |

* cited by examiner

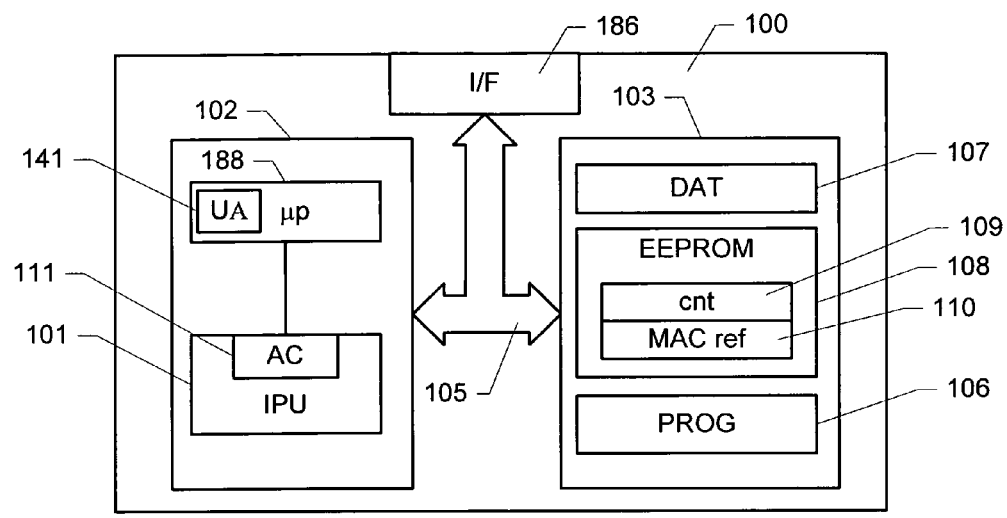
FIG. 1
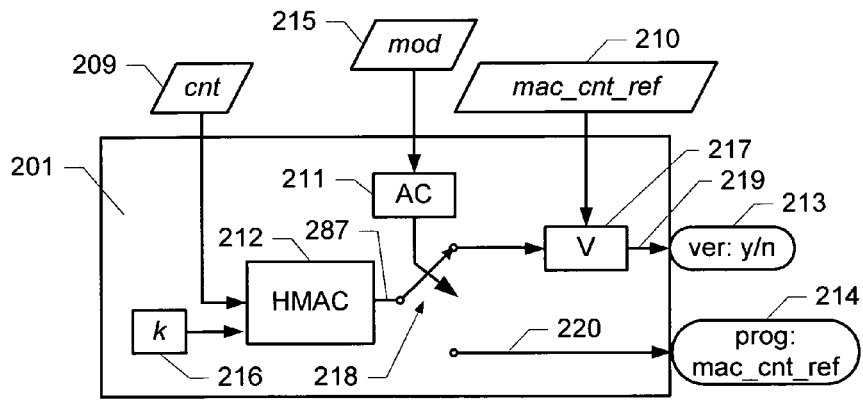
FIG. 2a
| VersionCount$_N$ | mac_VC$_N$_ref |
|---|---|
| ... | ... |
| VersionCount$_k$ | mac_VC$_k$_ref |
| VersionCount$_{k-1}$ | mac_VC$_{k-1}$_ref |
| ... | ... |
| VersionCount$_2$ | mac_VC$_2$_ref |
| VersionCount$_1$ | mac_VC$_1$_ref |
FIG. 2b
| VersionCount$_N$ | mac_VC$_N$_ref |
|---|---|
| ... | ... |
| VersionCount$_k$ | mac_VC$_k$_ref |
| VersionCount$_{k-1}$ | |
| ... | ... |
| VersionCount$_2$ | |
| VersionCount$_1$ | |
FIG. 2c

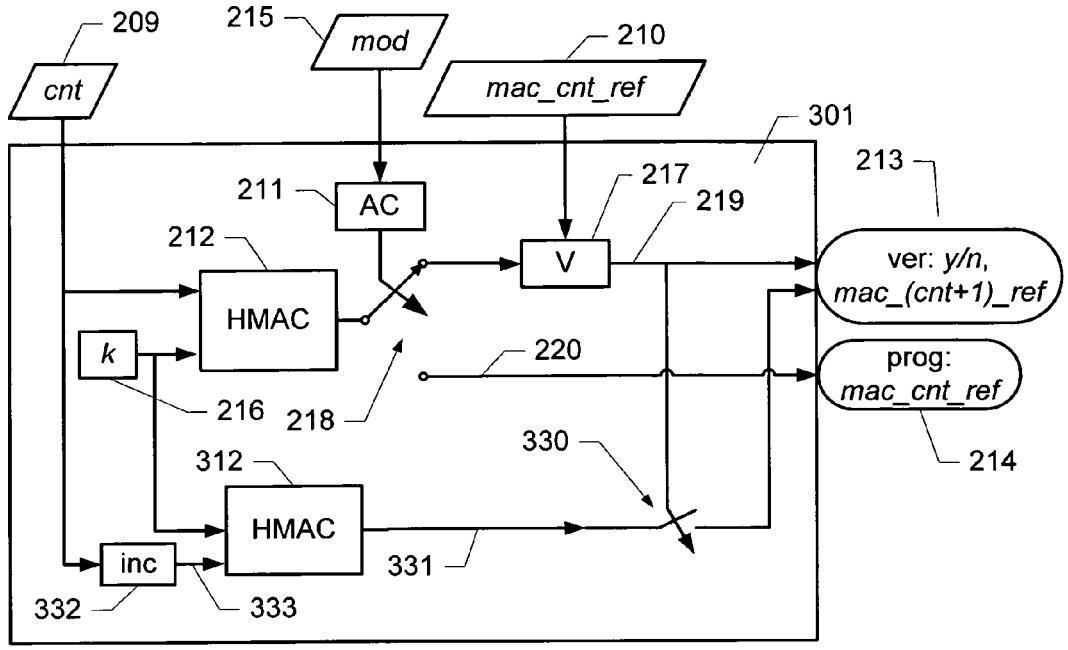
FIG. 3
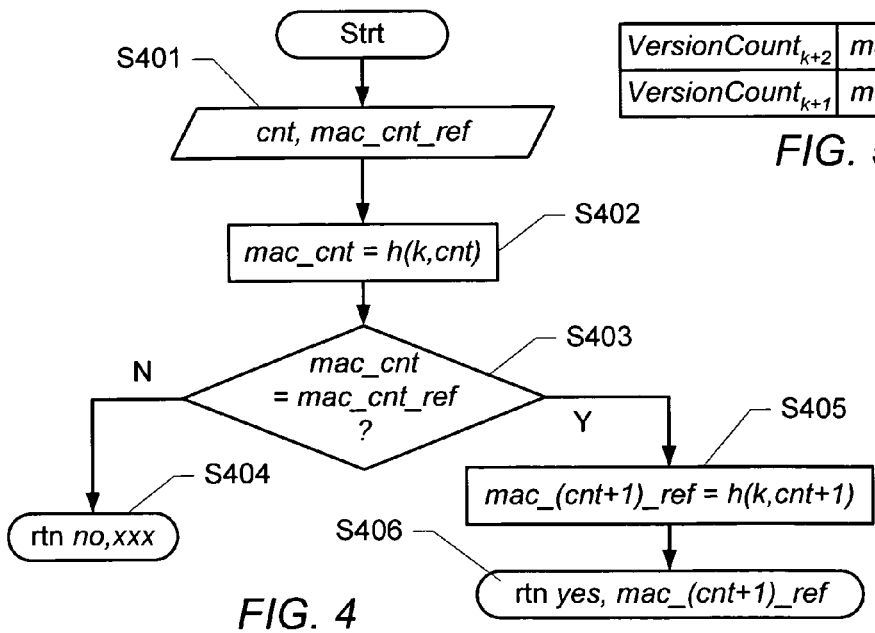
FIG. 4
| VersionCount$_{k+1}$ | mac_VC$_{k+1}$_ref |
| VersionCount$_k$ | mac_VC$_k$_ref |
FIG. 5a
| VersionCount$_{k+2}$ | mac_VC$_{k+2}$_ref |
| VersionCount$_{k+1}$ | mac_VC$_{k+1}$_ref |
FIG. 5b

ANTI-ROLL-BACK MECHANISM FOR COUNTER

This application claims the benefit of US Provisional Application No. 60/747,676 file May 19, 2006, the disclosure of which is fully incorporated herein by reference.

TECHNICAL FIELD

Disclosed is a method, product means, and a device for maintaining a counter.

BACKGROUND AND STATE OF THE ART

Embedded systems like mobile phones and other data processing devices depend on the execution of correct software. Furthermore, software even for rather small systems becomes increasingly complex, thereby increasing the risk of errors and unintended features, especially in early releases during a software life cycle. Furthermore, the functionality of early software releases is typically limited. Consequently, there is an increasing need for frequent updates of the software stored in embedded devices from older versions to updated versions. In order to keep track of which version is installed in the device, the device typically maintains a version counter whose value corresponds to the currently installed version number.

Even though methods are known, e.g. as disclosed in International patent application WO 02/27441, for protecting static and dynamic data against unauthorised manipulation, such methods do not provide protection against roll-back of software versions, e.g. they do not prevent a user who has authorisation to install software updates from re-installing older software versions.

However, it is generally desirable to enforce a software update policy that prevents a user who has acquired a mobile phone with an initial software version from performing a roll-back beyond the initial version, i.e. from re-installing an older software version that is older than the initial version. For example, such an unauthorised roll-back may not be desirable, since the older software version may include errors that allow a dishonest user to perform unauthorised or undesired operations with the device, such as breaking a SIM lock or the like.

Hence, it is generally desirable to provide a method for maintaining a version counter that prevents a user from performing a software roll-back beyond an initial software version—typically the version with which the user has acquired the processing device.

International patent application WO 01/33317 discloses an access control system for verifying that the data stored in a device is the latest authorized version of the protected data, e.g. data used to control access to other protected material. This prior art access control system includes a counter and a secure memory location that is configured to contain a parameter that binds the contents of the counter to the data that is being protected.

However, even though the above prior art system provides a unidirectional version counter, it is a problem of the above prior art system that it requires a secure memory location. For example, in the context of embedded systems such a secure memory location is typically implemented as a secure on-chip re-writable, non-volatile memory implemented in connection with the ASIC logic implementing the control system. However, the realisation of such secure re-writable non-volatile memory requires additional steps during ASIC production, thereby increasing the overall production costs.

SUMMARY OF THE INVENTION

The above and other problems are solved by a method of maintaining a version counter by a processing device, the version counter being indicative of a version of a memory content stored in said processing device, the method comprising selectively operating the processing device in one of a first and second mode, wherein access to operating the processing device in the first mode is limited to authorised users and controlled separately from access to the second mode.

The step of operating the processing device in the first mode includes
  generating at least an initial integrity protection value for cryptographically protecting the integrity of an initial counter value of said version counter during operation of the processing device in the second mode; wherein the initial counter value is selected from a sequence of counter values; and
  storing the initial integrity protection value as a current integrity protection value in a storage medium;

The step of operating the processing device in the second mode includes incrementing a current counter value to a subsequent counter value, the subsequent counter value being subsequent to the current counter value in the sequence of counter values; wherein incrementing includes removing the current integrity protection value for cryptographically protecting the integrity of the current counter value from said storage medium.

Consequently, a software anti-roll back mechanism is provided that does not rely on secure memory.

In particular, since the integrity protection values of revoked counter values are removed from the storage medium, and since a calculation of the integrity protection value is only allowed in a separately protected mode of operation, a regular user without specific authorisation is prevented from re-generating a revoked counter value.

As mentioned above, in embodiments of the processing device described herein, the processing device is selectively operatable in one of a first and second mode, wherein access to operating the processing device in the first mode is limited to authorised users and controlled separately from access to the second mode. Hence, a user who is authorised to operate the device in the second mode is not necessarily also authorised to operate the device in the first mode. The selective operation may for example be implemented by providing two modes in which the device can be booted, or by initially granting access in the second mode and, conditioned on a successful access control, provide access to additional functionality provided in the first mode.

The removal of the integrity protection value may be performed in a number of different ways, e.g. by overwriting a revoked integrity protection value by an updated value, by overwriting the protection value by predetermined data items, e.g. zeros, or in any other suitable way that prevents a user from subsequently retrieving the removed data from the storage medium.

It is an advantage of the method and device described herein that an accidental roll-back of the version counter is prevented. Furthermore, an intentional roll-back to an older counter value corresponding to a version number that has previously been installed under the control of the present user is made difficult, since it requires a manipulation of the stored integration protection values, e.g. by retrieving all integration protection values, and re-entering them after they have been deleted in connection with an incrementing of the version counter. In any event, the user is prevented from rolling back the version counter beyond its initial value, i.e. the value of the counter at the time the user has acquired the device.

The above update policy may, on the face of it, seem to be less strict than a policy that strictly prevents every version roll-back including a roll-back back to the initial version with which the device was acquired, once the device was updated in the meantime to a subsequent version. However, it should be observed that a strict enforcement of such an update policy would require a mechanism for forcing a user to update the software whenever an update to a newer version is available. Without such a mechanism, the user may just omit updating the device and thereby still being able to operate the device with the initial software version without having to perform a version roll-back.

For the purpose of the present description, the term version counter is intended to refer to any device or mechanism that provides a substantially unique value for each of a sequence of versions of memory content, e.g. software versions, versions of stored data, or the like. The version counter may be implemented as a sequentially ordered set of data items, e.g. numbers or other values. It is understood that the version counter may also be implemented as a random number generator that generates a non-repetitive sequence of random numbers or as another unique value generator. In some embodiments, the version counter is a version counter for counting a software version of software installed in the device.

In some embodiments, operating the processing device in the first mode includes generating a sequence of integrity protection values for cryptographically protecting the integrity of respective ones of a sequence of counter values; wherein the sequence of counter values is sequentially ordered starting from said initial counter value; and storing the sequence of integrity protection values in a storage medium.

Consequently, according to this embodiment a set of integrity protection values is created and stored during an initial operation of the device in the first mode. Whenever, the version counter is to be incremented from a current value to a subsequent value during subsequent operation of the device in the second mode, the integrity protection value or values corresponding to counter values preceeding the subsequent value—and in particular the integrity protection value corresponding to the current counter value—are removed from the storage medium, thereby preventing subsequent cryptographic verification of the current counter value.

In some embodiments, two modes of incrementing the counter may be provided: an irreversible incrementing wherein the previous integrity protection values are removed, and a reversible incrementing, where the integrity protection values are not removed. In yet another embodiment, the removal of the integrity protection value may be performed after a predetermined time has been elapsed from the actual incrementing of the counter. Alternatively or additionally, the removal of the integrity protection value may be performed after a predetermined number of reboots after the actual incrementing of the counter. Such a delayed commitment of the counter update may be useful in order to allow a user to test the proper operation of an updated software version before committing to it.

In one embodiment, the method further comprises providing an integrity protection value calculation unit adapted to output a generated integrity protection value of said sequence of integrity protection values only when the device is operated in the first one of said first and second modes. Consequently, only a user authorised to operate the device in the first mode can (re)calculate the integrity protection values. For example, a device manufacturer may chose to limit access to the first mode to said manufacturer. Consequently, the manufacturer may, during production of the electronic device, operate the device in the first mode as to generate and store a suitable number of integrity protection values on the device. All subsequent users who acquire the device may only access the device in the second mode and are thus prevented from re-generating integrity protection values for outdated counter values.

In some embodiments, incrementing a current counter value to a subsequent counter value includes generating a subsequent integrity protection value corresponding to the subsequent counter value; and replacing the current integrity protection value with the subsequent integrity protection value. Consequently, in this embodiment, there is no need to store a large number of integrity protection values in the device from the outset, thereby saving storage capacity and avoiding limiting the range of protectable counter values by the number of stored integrity protection values. Furthermore, when operated in the second mode, the device only generates integrity protection values corresponding to subsequent counter values, thereby still preventing a user not authorised to operate the device in the first mode from re-generating integrity protection values of previous counter values, i.e. lower ranking counter values than the current counter value with respect to the sequential ordering of counter values.

When generating the subsequent integrity protection value comprises verifying the current counter value based on the current integrity protection value and generating said subsequent integrity protection value conditioned on a successful verification of said current counter value, the security of the method is further increased, since the device only generates a subsequent integrity protection value when the current value is successfully verified.

When each generated integrity protection value is unique for the corresponding counter value and the device, a user is prevented from merely copying previous integrity protection values from another device in which the counter has not yet been incremented.

The term integrity protection value is intended to comprise any data item generated by a mechanism for assuring that information stored in the memory is not accidentally or maliciously altered or destroyed. Examples of integrity protection mechanisms include message authentication codes, one-way hash functions, and digital signatures. When the integrity mechanism is a cryptographic integrity protection mechanism, i.e. based on a secret key, the security of the integrity protection is increased. When the integrity protection value is a message authentication code, a particularly secure and efficient integrity protection is achieved.

Message authentication codes (MAC) are a known mechanism for integrity protecting data. A MAC is a function that takes a variable length input and a key to produce a fixed-length integrity protection value as an output, the so-called MAC value or tag value. MACs are typically used between two parties that share a secret key in order to validate information transmitted between these parties. A MAC may be calculated by applying a one-way hash function to the data and encrypting the result using a secret key. Examples of suitable MAC functions that can be combined with a cryptographic hash function include HMAC (Keyed-Hashing for Message Authentication), Cipher Block Chaining (CBC) MAC using for example AES or a secure one-way hash function. In embodiments of the method and device described herein, a message authentication code is used to check the integrity of the counter value stored in a storage medium of the processing device, thereby avoiding the need for storing the counter value in a secure memory location.

Consequently, in some embodiments, integrity protecting comprises storing the calculated reference integrity protection value, e.g. a message authentication code value, in relation to the counter value to be protected, thereby making it available for subsequent audits of the counter value by the processing device. Hence, when auditing the counter value, the device calculates the integrity protection value of the counter value using the secret key stored in the device, and compares the result with the previously stored reference integrity protection value, e.g. reference MAC value. Consequently, in this embodiment, the secret key need only be known to the digital processing device. In some embodiments, the secret key is a secret data item unique to the processing device, e.g. a secret data item known only to the processing device.

When each of the counter values is device unique, an additional protection against copying integrity protection values from one device to another device is provided.

In some embodiments, the generation and verification of the counter values by means of the corresponding integrity protection values is implemented by an integrity protection module, which integrity protection module is secured against modification, thereby increasing the security of the process. The integrity protection module may for example be implemented by a protected hardware module and/or by trusted program code. Here the term trusted program code is intended to include any integrity-protected program code, such as program code included in the firmware of the processing device, code that is cryptographically integrity checked prior to its execution, program code that is included in the boot ROM code of the processing device, or the like, e.g. based on a integrity protection value stored in a One-Time Programmable (OTP) memory.

In some embodiments, the method further comprises
  receiving an updated version of said memory content, the updated version including a version indicator;
  verifying the authenticity of the received memory content;
  performing a version control of the received updated memory content based on the version indicator and the current value of the version counter;
  accepting the received updated memory content conditioned on a result of the version control.

Consequently, an efficient and secure update of the memory content is provided. The processing device may receive the memory content via any suitable data interface, e.g. on a computer-readable medium such as a CD, a memory stick or other memory device, via a wired or wireless communications interface, or the like.

The verification of the authenticity may include any suitable technique known as such in the art, e.g. by means of a digital signature and/or certificate, by means of a message authentication code, and/or the like.

The version control may include any suitable version control mechanism known as such in the art, for example as used for software numbering of software modules in the IBM AIX Unix operating system and the numbering of the LINUX kernel, e.g. by comparing the version indicator with the current value of the version counter. In some embodiments, the updated memory content is accepted when the version indicator is larger or equal to the lowest authentic counter value of the version counter, i.e. the lowest counter value for which a valid integrity protection value is stored in the device. When the version control fails, e.g. because the received version is older or incompatible with the current version or the lowest authentic version, the update process may be aborted, an error message may be generated, and/or the device may proceed in any other suitable way.

When accepted, the device typically stores the updated memory content so as to replace the corresponding memory content. In some embodiments the updating further comprises incrementing the version counter to a value corresponding to the version indicator of the received updated memory content as described herein. For example, the incrementing may include setting the version counter equal to the received version indicator. In another embodiment, the incrementing may include setting the version counter equal to the counter value having a position in the sequence of version counters equal to the received version indicator.

The present invention relates to different aspects including the method described above and in the following, corresponding devices, and computer programs, each yielding one or more of the benefits and advantages described in connection with the above-mentioned method, and each having one or more embodiments corresponding to the embodiments described in connection with the above-mentioned method.

More specifically, according to another aspect, a data processing device configured to maintain a version counter indicative of a version of a memory content stored in said processing device is selectively operatable in one of a first and second mode, wherein access to operating the processing device in the first mode is limited to authorised users and controlled separately from access to the second mode.

The processing device is configured, when operated in the first mode, to perform the following steps:
  generating at least an initial counter value of said version counter, wherein the initial counter value is selected from a sequence of counter values;
  generating an initial integrity protection value for cryptographically protecting the integrity of the generated initial counter value during operation of the processing device in the second mode; and
  storing the initial integrity protection value as a current integrity protection value in a storage medium.

The processing device is further configured, when operated in the second mode, to increment a current counter value to a subsequent counter value, the subsequent counter value being subsequent to the current counter value in the sequence of counter values; wherein incrementing includes removing the current integrity protection value for cryptographically protecting the integrity of the current counter value from said storage medium.

The term processing device is intended to comprise any electronic device comprising processing means for data processing. In particular, the term processing device is intended to comprise any electronic equipment, portable radio communications equipment, and other handheld or portable devices, and integrated circuits, chips or chipsets for use in such equipment. The term portable radio communications equipment includes all equipment such as mobile terminals, e.g. mobile telephones, pagers, communicators, electronic organisers, smart phones, personal digital assistants (PDAs), handheld computers, or the like.

The term storage medium is intended to include any circuitry or device suitable for storing digital data items. Examples of such storage media include non-volatile memory, a read-only-memory (ROM), a random access memory (RAM), a flash memory, an Erasable Programmable Read-Only Memory (EPROM), or the like. In some embodiments, the storage medium is included in the processing device.

According to another aspect, a method of updating memory content stored in a processing device comprises: maintaining a version counter by said processing device, the version counter being indicative of a version of said memory content, wherein maintaining the version counter includes selectively operating the processing device in one of a first and second mode, wherein access to operating the processing device in the first mode is limited to authorised users and controlled separately from access to the second mode; wherein operating the processing device in the first mode includes
    generating at least an initial integrity protection value for cryptographically protecting the integrity of an initial counter value of said version counter during operation of the processing device in the second mode; wherein the initial counter value is selected from a sequence of counter values; and
    storing the initial integrity protection value as a current integrity protection value in a storage medium;
wherein the method further comprises
    operating the processing device in the second mode;
    receiving an updated version of said memory content, the updated version including a version indicator;
    verifying the authenticity of the received memory content;
    performing a version control of the received updated memory content based on the version indicator and the current value of the version counter;
    accepting the received updated memory content conditioned on a result of the version control; and
    incrementing a current counter value to a subsequent counter value, the subsequent counter value corresponding to said version indicator and being subsequent to the current counter value in the sequence of counter values; wherein incrementing includes removing the current integrity protection value for cryptographically protecting the integrity of the current counter value from said storage medium.

It is noted that the features of the methods described above and in the following may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

Hence, according to another aspect, a computer program comprises program code means adapted to cause a data processing device to perform the steps of the method described above and in the following, when said computer program is run on the data processing device.

For example, the program code means may be loaded in a memory, such as a RAM (Random Access Memory), from a storage medium or from another computer via a computer network. Alternatively, the described features may be implemented by hardwired circuitry instead of software or in combination with software.

BRIEF DESCRIPTION OF THE DRAWINGS

The above and other aspects will be apparent and elucidated from the embodiments described in the following with reference to the drawing in which:

FIG. 1 shows a schematic block diagram of an embodiment of a processing device.

FIG. 2 shows a schematic block diagram of an example of a processing unit for implementing a counter, and an example of a data structure for maintaining version counter values and integrity protection values.

FIG. 3 shows a schematic block diagram of another example of a processing unit for implementing a counter.

FIG. 4 shows a flow diagram of an embodiment of a counter mechanism.

FIG. 5 shows an example of a data structure for maintaining version counter values and integrity protection values.

DETAILED DESCRIPTION

FIG. 1 shows a schematic block diagram of a device comprising one or more Application Specific Integrated Circuit (ASIC) as an example of a processing device, e.g. one or more ASICs for use in a mobile terminal or any other electronic equipment. The ASIC device, generally designated 100, comprises a central processing logic block 102, an interface block 186 for inputting/outputting data to from the ASIC device, and a data storage block 103 for storing data and/or program code. The data storage block 103 is connected with the central processing logic block 102 via a system bus 105. The data storage block 103 includes a program memory block 106 for storing program instructions, a data memory block 107 for accommodating registers, random access memory (RAM) and/or the like, and a re-writable non-volatile memory block 108, e.g. an electrically erasable programmable read only memory (EEPROM). The program memory block may be implemented as read-only memory (ROM), and erasable programmable read only memory (EPROM), Flash memory, EEPROM or the like. It is understood, however, that the data storage block may include additional and/or alternative memory blocks or storage types.

The central processing logic block 102 comprises a microprocessor 188 or other logic circuitry suitable for controlling the operation of a mobile terminal or other electronic equipment, e.g. by executing program code stored in the data storage block 103. In particular, the central processing logic block 102 is configured to maintain a version counter value stored in a location 109 of the non-volatile memory block 108 for maintaining the version number of a program code stored in the data storage block 103. Furthermore, the central processing logic block is configured to initiate integrity audits of the version counter value 109, e.g. at regular intervals, during the boot process, during installation/upgrade and/or before execution of the program code to which the version counter is associated, and/or the like. Furthermore, the central processing logic block 102 is configured to initiate an incrementing of the stored version counter value 109 when a new version of the corresponding software is loaded into the data storage block 103.

To this end the central processing block 102 comprises an integrity protection logic block 101 including logic circuitry configured to verify the integrity of the counter value 109 as described in greater detail below so as to protect the counter value from manipulation by an unauthorised user, e.g. modification, replacement by another value, in particular lower value, etc. To this end, the non-volatile memory block 108 further comprises a storage location 110 for storing one or more integrity protection values for use by the verification process implemented by the integrity protection logic block 101. The integrity protection values are generated by the integrity protection logic block 101 and used as reference integrity protection values by the integrity protection logic block 101 during verification of the counter value(s) stored at storage location 109. The integrity protection logic block 101 is operatable in two modes, a first or so-called "prog mode", and a second or so-called "verify mode." The mode of operation is controlled by the central processing logic block 102 by means of a suitable control signal. At least one initial reference protection value is generated by the integrity protection logic block 101 when operated in "prog mode." The generated integrity protection value is stored in storage location 110 as a reference value for later verification purposes. The verification of the counter value(s) stored in location 109 is performed by the integrity protection logic block 101 when operated in the "verify mode."

As will be described in greater detail below, the integrity protection logic block 101 includes an access control block 111 configured to perform a separate authentication process when a user requests operation of the integrity protection logic block 101 in "prog mode". Alternatively, the access control 111 may be performed by an access control block external to the integrity protection logic block 101. It is understood that operation of the processing device as such, e.g. in "verify mode," may also be subject to a user authentication process, e.g. by means of an initial access control. Hence, the access control 111 for operating the integrity protection logic block 101 in the "prog mode" may be performed in addition to the initial access control or alternative to the initial access control. In the first case, the user may be required to initially get authorised access to the device, e.g. to operating the device in the "verify mode". In order to switch operation to the "prog mode" an additional access control different from the initial access control is required. In the second case, the device may for example be bootable in two alternative modes of operation, one including operating the device in "verify mode" and the other including operating the device in "prog. mode". Hence, depending on which mode the user wishes to operate the device in, the user performs a corresponding one of the access control processes.

The integrity protection logic block 101 is implemented as a protected hardware block, i.e. as a hardware block that is secured against unauthorised access. In particular, in some embodiments, the integrity protection logic block 101 is configured such that at least an initial integrity protection value only can be read out from the integrity protection logic block 101 when the ASIC is operated in "prog. mode", i.e. when the user who has booted the ASIC is authorised to operate the ASIC in the "prog mode."

The verification of the user authorisation may be performed in any suitable manner, e.g. by requiring the user to enter an access code that is compared with a previously stored value, by requiring the user to enter a valid key card or other hardware security device, by performing an authentication mechanism based on a physical attribute of the user, such as a fingerprint, or any other suitable mechanism for establishing that the user is the one who has been authorised. An example of a suitable method for providing proof of authorisation is the so-called Fiat-Shamir identification algorithm, e.g. as described in U.S. Pat. No. 4,748,668. It is understood that the access control for entering the "prog. mode" may be based on the same or a different authentication mechanism as the access control for operating the device in "verify mode". For example, access to both modes may be controlled by the same authentication mechanism based on an access code, but where different access codes are required for the two modes.

The hardware protection may be implemented by any suitable protection technique, for example the techniques used to protect the hardware in smart cards as described in Chapter 8.2 "Smart card Security" of "Smart Card Handbook", by W Rakl, W Effing, 3rd ed., Wiley 2003.

It is interesting to note that the counter value(s) 109 and the integrity protection value(s) 110 are stored external to the protected integrity protection logic block 101. In particular, the counter value(s) 109 and the integrity protection value(s) 110 may be stored in unprotected non-volatile memory, in particular re-writable memory, e.g. the memory block 108 of the device of 100.

Even though the ASIC device 100 is shown as a single block, it will be appreciated that the device 100 may be implemented as a plurality of different ASICs. For example, in order to reduce production costs, it may be desirable to implement the EEPROM and the microprocessor and integrity protection logic block on different ASICs. Hence, the terms ASIC and ASIC device are intended to include a single ASIC as well as a combination of separate ASICs.

Embodiments of the integrity protection logic block 101 will now be described in greater detail with reference to FIGS. 2 and 3.

FIG. 2 shows a more detailed block diagram of an example of an integrity protection logic block. The integrity protection logic block 201 comprises a MAC calculation block 212 configured to compute one or more cryptographic message authentication code (MAC) values for protecting respective counter values.

In general, the MAC calculation can be expressed by the following equation $M=H(k, d)$, where H is a suitable MAC function, d is the data to be protected, M is the calculated MAC value, and k is a secret key value. In some embodiments, the secret k is accessible on the ASIC 100 but is not readable out of the ASIC 100. An example of a suitable MAC function is the HMAC function as defined in the Network Working Group Request for Comments (RFC) 2104, "HMAC: Keyed-Hashing for Message Authentication", February 1997. Accordingly, in the context of the present authentication of a counter value cnt, designated 209, the integrity protection logic block 201 receives the counter value 209 from the storage block 109 and feeds the counter value 209 into the MAC calculation block 212. The MAC calculation block 212 further receives a secret key k, designated 216, stored securely against undesired read-out, e.g. in a secured memory, e.g. an internal ROM, of the ASIC 100 or the integrity protection block 201, i.e. such the integrity protection block 201 has read access to the secret key k. The MAC calculation block 212 calculates the MAC value $M=H(k,cnt)$ and forwards the calculated value 287 to mode selector 218, e.g. a switch.

As described above, the integrity protection block 201 can be operated in two modes, a "prog mode" and a "verify mode," as controlled by a control input 215. As described above, operation in "prog. mode" is subject to a corresponding access control implemented by access control 211. Accordingly, access control block 211 receives the mode selection control signal 215. If the mode selection signal 215 corresponds to "prog. mode", the access control block 211 verifies the authenticity of the user as to ensure that operation of the integrity protection block in "prog. mode" is limited to authorized users as described above. If the user is authorized, the access control block 211 forwards the mode selection signal 215 as a control signal to selector 218 so as to control the data flow of the calculated MAC value. If the mode selection signal 215 corresponds to "verify mode," the access control block 211 forwards the selection signal to the selector 218. It is understood that, in some embodiments, the "verify mode" may also be subject to an access control.

When operated in "prog. mode," the selector 218 forwards the calculated MAC value 287 via connection 220 to an output 214 from where the MAC value is stored as a reference MAC value in storage location 110. In this embodiment, the integrity protection block 201, when operated in "prog. mode," is controlled to compute and store in storage location 110 a plurality of MAC values $mac\_VC_1\_ref=H(k,VersionCount_1)$, $mac\_VC_2\_ref=H(k, VersionCount_2)$, ..., $mac\_VC_N\_ref=H(k,VersionCount_N)$ for a predetermined number N of version counter values $VersionCount_1$, $VersionCount_2$, ..., $VersionCount_N$. For the purpose of the present description it is assumed that the version count values are ordered in increasing orders, i.e. $VersionCount_1 < VersionCount_2 < ... < VersionCount_N$. It is understood, however, that the counter values may be sequentially ordered according to any suitable ordering scheme. The number N of pre-computed and stored MAC values may be selected as a trade-off between required storage space and the anticipated number of version updates that should be managed by the protected version counter. For example, the version MAC values 214 may be stored in relation to the respective version count values, e.g. in a tabular data structure as illustrated in FIG. 2b. Alternatively, the version MAC values may be stored independently of the version counter values. For example, in embodiments where the device includes logic for generating the sequence of counter values, e.g. by incrementing a counter, the counter values do not need to be explicitly stored.

When operated in "verify mode" the selector 218 feeds the calculated MAC value to a verifier block 217, e.g. a comparator. The verifier block 217 compares the calculated MAC value 287 with one or more of the reference MAC values 210 stored at storage location 110. In an embodiment where the reference MAC values 210 are stored in relation to their respective counter values 209, the verifier block may compare the calculated MAC value 287 with the reference value 210 stored in relation to the counter value from which the MAC value 287 was calculated. Alternatively, the verifier block 217 may successively compare the calculated MAC value 287 with the stored reference values 210 until a match is found or until all reference values have been processed. The verifier block 217 generates an output signal 219 indicative of whether a matching reference MAC 210 corresponding to the calculated MAC 287 was found, i.e. the output signal 219 indicates whether the counter value 209 is authentic and up-to-date. The output signal 213 is output by the integrity protection block 201 at output node 213.

At each start-up of the processing device or whenever requested by an application running on the processing device, e.g. by the platform of core software, the integrity protection block is controlled to verify the current counter value stored in storage location 109 as described above. In some embodiments, the integrity of the version counter is verified each time a version control process accesses the version counter. If the calculated MAC value 287 corresponds to the reference MAC value 210 stored in the memory 110, the processing device continues to function normally; otherwise some or all of the functionality of the processing device are disabled and/or another appropriate action is taken.

The version counter described herein may be used for software version control in a number of different ways. In the following, two examples will be described where the current value of the version counter, i.e. the lowest counter value that has a valid integrity protection value associated with it, identifies the lowest allowed software version that is allowed to be executed on the processing device.

In one example, the version control is performed by the installed software itself. In such a system the software is provided with a digital signature so as to ensure that the software has not been altered by an unauthorised user. Examples of suitable methods for verifying the authenticity of the received/stored software include the methods described in U.S. Pat. No. 6,026,293, or in the specifications of the PC Client work group of the Trusted Computing Group (www.trustedcomputinggroup.org.) Alternatively or additionally, the authenticity of the software may be protected by another suitable mechanism. When the processing device is booted and/or when execution of the software is initiated, the processing device verifies the digital signature of the software. If the digital signature is not verified successfully, the booting process and/or the execution of the software is aborted. The software further includes a version indicator indicating the version number of the software. When execution of the software is initiated, the software compares its own version indicator with the current allowed version number(s) as indicated by the current counter value of the version counter maintained by the processing device as described herein. If the version indicator of the software is equal to or larger than the current counter value of the version counter, the software continues execution; otherwise execution is aborted. If the version indicator of the software is larger than the current counter value of the version counter, the processing device increments the version counter to an updated value equal to the version indicator of the installed software. As described herein, this incrementing includes removing the integrity protection value(s), e.g. MAC value(s), associated with all counter values smaller than the updated value.

In an alternative example, the version control described above is performed by a separate loader software or start-up software. Nevertheless, in this alternative embodiment, the digital signature or other integrity protection of the software to be executed still prevents unauthorised manipulation (e.g. altering of the version indicator) of the software to be executed.

When the processing device 100 is controlled to update/increment/step-up the version counter from a current value to a subsequent value, the processing device 100 removes all reference MAC values associated with counter values smaller than said subsequent counter value from the memory 110. For example, the update of the counter value may be performed by a software update agent 141 executed on the microprocessor 188 of the central processing logic block 102. In some embodiments, the stepping up of the version counter is implemented in the secured part of the ASIC. Alternatively, the stepping up may be performed by trusted/verified software.

In the above example of version counter values $VersionCount_1$, $VersionCount_2$, ..., $VersionCount_N$, when the version counter is incremented from $VersionCount_1$ to $VersionCount_2$, the processing device removes the MAC value $mac\_VC_1\_ref$ from the memory. Similarly, if the version counter is incremented to $VersionCount_K$, the processing device removes the MAC values $mac\_VC_1\_ref$, ..., $mac\_VC_{k-1}\_ref$ from the memory. FIG. 2c illustrates the table of counter values and MAC values shown in FIG. 2b, but after update of the counter value to $VersionCount_K$, i.e. with the MAC values $mac\_VC_1\_ref$, ..., $mac\_VC_{k-1}\_ref$ removed from memory. Hence, in general the current counter value is the smallest counter value whose integrity is successfully verifiable, i.e. the smallest counter value for which a valid associated integrity protection value is stored in the device. Consequently, a subsequent attempt to verify the lower counter values by the integrity protection block would fail, as the corresponding reference MAC value is no longer present.

Furthermore, a user who is not authorised to operate the ASIC in the "prog. mode" cannot re-compute MAC values corresponding to the previous (lower) counter values.

The above example further illustrates that the subsequent counter value may be any subsequent counter value of the sequence and does not have to be the immediately next counter value, i.e. intermediate counter values may be skipped when incrementing the counter value. In the above example, the counter value may e.g. be incremented from VersionCount$_1$ to VersionCount$_2$ or to VersionCount$_k$ with k>2. This may for example be useful, when a software version is updated to a new version such that one or more intermediate versions are skipped.

FIG. 3 shows a more detailed block diagram of another example of an integrity protection logic block 301. The integrity protection logic block 301 is similar to the integrity protection block of FIG. 2 and comprises a MAC calculation block 212 configured to compute one or more cryptographic message authentication code (MAC) values for protecting respective counter values, an access control block 211 controlling a selector 218, and a verifier block 217. The MAC calculation block 212, the access control block 211, the selector 218, and the verifier block 217 have been described in connection with FIG. 2 and will not be described again here.

The integrity protection block 301 differs from the integrity protection block 201 of FIG. 2 in that the integrity protection block 301 comprises a further MAC calculation block 312. The MAC calculation block 312 performs the same calculation as the MAC calculation block 212, and it receives the same secret key k. However, the MAC calculation block 312 receives an incremented counter value 333 instead of the counter value 209 fed into the MAC calculation block 212. To this end the integrity protection block 301 includes an incrementing block 332 that receives the counter value 209 and generates the incremented counter value 333, i.e. the next counter value in the sequence of counter values. Alternatively, the MAC calculation blocks 212 and 312 may be combined in a single block, optionally together with the incrementing block 332. In yet another alternative embodiment, the integrity protection block 301 includes only a single MAC calculation block which is controlled to generate the MAC values for the counter value 209 and the incremented counter value 333 sequentially. The MAC value 331 of the incremented counter value 333 generated by the MAC calculation block 312 is fed to a switch 330. The switch 330 is controlled by the output 219 of the verifier block 217 such that the switch 330 feeds the MAC value 331 to the output 213 if the verifier block 217 has successfully verified the MAC value of the current counter value 109 against the reference MAC value 110. If the verifier block 217 has not successfully verified the current counter value (or if the verifier block 217 has not received an input from MAC calculation block 212, because the integrity protection block 301 is operated in "prog. mode"), the MAC value 331 is not provided at output 213.

Hence, in the example of FIG. 3, the integrity protection block 301 is configured so as to output the MAC value of VersionCount$_{k+1}$ when the integrity protection block 301 is operated in "verify mode", and if the version counter value VersionCount$_k$ is verified successfully against its reference MAC. In this embodiment, the integrity protection block 301 is operated in "prog. mode" so as to generate and store one initial reference MAC for the first valid counter value only. Typically this is done during the production of the device, e.g. as part of a production step where the device is loaded with software by the manufacturer. In this case, the manufacturer is authorised to operate the device in "prog. mode." Any key, password, or the like, required to activate the device in "prog. mode" may thus be kept secret by the manufacturer.

The process performed by the integrity protection block 301 of FIG. 3 when operated in "verify mode" will now be described in greater detail with reference to FIG. 4.

FIG. 4 shows a flow diagram of an embodiment of a counter mechanism. In initial step S401, the process receives the current counter cnt and the corresponding MAC reference value mac_cnt_ref. In subsequent step S402, the process computes the MAC value mac_cnt=h(k,cnt) from the received counter value cnt and the secret key k. In step S403, the process compares the computed MAC value mac_cnt with the received reference MAC value mac_cnt_ref. If they are equal, the process proceeds at step S405; otherwise the process proceeds at step S404. At step S404, the process outputs an error condition "no" indicating that the verification of the current counter was not successful, and the process terminates. Optionally, the process may further output the incorrect reference value mac_cnt_ref which the process received. At step S405, i.e. if the calculated and the reference MAC values agree, the process computes the MAC value h(k,cnt+1) of the incremented counter cnt+1 and outputs the calculated value in step S406 as a reference MAC mac_(cnt+1)_ref=h(k,cnt+1) together with an indication "yes" that the current counter value is verified successfully.

It is an advantage of this embodiment that it reduces the list of MAC reference values to be stored to the current and the subsequent reference value, thereby saving memory space in the device. When the version counter is incremented, the processing device replaces the stored current reference value mac_cnt_ref with the subsequent reference value mac_(cnt+1)_ref calculated during a previous verification step. The next reference MAC value mac_(cnt+2)_ref is thus generated during a subsequent verification step. In some embodiments, only the current reference value is saved. For example, a software update may involve a verification of the current counter, which in turn results in the subsequent reference value to be calculated and output as described above. The current reference value may thus be replaced by the subsequent value in memory.

FIG. 5 shows an example of a data structure for maintaining version counter values and integrity protection values in connection with the embodiment described in connection with FIGS. 3 and 4. FIG. 5a shows a tabular structure in which the current counter value—in this example VersionCount$_k$—and the next higher counter value—in this example VersionCount$_{k+1}$—are stored in relation to their respective reference MAC values mac_VC$_k$_ref and mac_VC$_{k+1}$_ref. FIG. 5b shows the tabular structure after a version update to version VersionCount$_{k+1}$. Accordingly, in the tabular structure, the outdated counter value and reference MAC have been overwritten by the new current values VersionCount$_{k+2}$ and mac_VC$_{k+2}$_ref, respectively. Furthermore, the new subsequent values VersionCount$_{k+2}$ and mac_VC$_{k+2}$_ref have been written into the data structure. Hence, again, the current counter value is the smallest counter value whose integrity is successfully verifiable, i.e. the smallest counter value for which a valid associated integrity protection value is stored in the device. A subsequent attempt to verify the lower counter values by the integrity protection block would fail, as the corresponding reference MAC value is no longer present. Furthermore, a user who is not authorised to operate the ASIC in the "prog. mode" cannot re-compute MAC values corresponding to the previous (lower) counter values, since the ASIC, when operated in "verify mode" only outputs subsequent MAC values and not current or previous MAC values.

Although some embodiments have been described and shown in detail, the invention is not restricted to them, but may also be embodied in other ways within the scope of the subject matter defined in the following claims.

In particular, the embodiments have mainly been described with reference to a mobile terminal as an example of a data processing device. It is understood, however, that the method, product means, and device described herein may also be applied to other data processing devices.

Furthermore, the embodiments have mainly been described in connection with a single software version counter. It is understood, however, that the method, device and product means described herein may also been applied to other types of version counters for counting other update events, states, etc. involving versions of memory content other than software versions. Examples of such memory contents include but are not limited to stored data, e.g. data stored in a database or the like. Similarly, a processing device may maintain more than one counter by means of the mechanisms described herein, e.g. different counters for different software entities or modules, data items, and/or the like.

The method, product means, and device described herein can be implemented by means of hardware comprising several distinct elements, and by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

What is claimed is:

1. A method of maintaining a version counter by a processing device, the version counter being indicative of a version of a memory content stored in said processing device, the method comprising the steps of:
    selectively operating the processing device in one of a first and a second mode, wherein access to operating the processing device in the first mode is limited to authorized users and controlled separately from access to the second mode;
    wherein operating the processing device in the first mode includes:
        generating at least an initial reference integrity protection value for cryptographically protecting the integrity of an initial counter value of said version counter during operation of the processing device in the second mode and wherein the initial counter value is selected from a sequence of counter values; and
        storing the initial reference integrity protection value as a current reference integrity protection value in a storage medium;
    wherein outputting reference integrity protection values of at least the current and earlier counter values of said sequence of counter values is restricted to the first mode; and
    wherein operating the processing device in the second mode includes:
        verifying the integrity of a current counter value based on the current reference integrity protection value;
        incrementing a current counter value to a subsequent counter value, the subsequent counter value being subsequent to the current counter value in the sequence of counter values and wherein incrementing includes removing the current reference integrity protection value for cryptographically protecting the integrity of the current counter value from said storage medium.

2. The method according to claim 1, wherein operating the processing device in the first mode includes the steps of:
    generating a sequence of reference integrity protection values for cryptographically protecting the integrity of respective ones of a sequence of counter values, wherein the sequence of counter values is sequentially ordered starting from said initial counter value; and
    storing the sequence of reference integrity protection values in a storage medium.

3. The method according to claim 2, further comprising providing an integrity protection value calculation unit adapted to output a generated reference integrity protection value of said sequence of reference integrity protection values only when the device is operated in the first one of said first and second modes.

4. The method according to claim 1, wherein incrementing a current counter value to a subsequent counter value includes generating a subsequent reference integrity protection value corresponding to the subsequent counter value; and
    replacing the current reference integrity protection value with the subsequent reference integrity protection value.

5. The method according to claim 4, wherein generating the subsequent reference integrity protection value comprises verifying the current counter value based on the current reference integrity protection value and generating said subsequent reference integrity protection value conditioned on a successful verification of said current counter value.

6. The method according to claim 1, wherein each generated reference integrity protection value is unique for the corresponding counter value and the device.

7. The method according to claim 1, wherein each generated reference integrity protection value is a message authentication code value generated by a message authentication code function from a value of said version counter and a secret key value.

8. The method according to claim 7, wherein the secret key value is device specific.

9. The method according to claim 1, wherein each of the counter values is device unique.

10. The method according to claim 1, wherein the generation and verification of the counter values by means of the corresponding reference integrity protection values is implemented by an integrity protection module, which integrity protection module is secured against modification.

11. The method according to claim 10, wherein the integrity protection module is a hardware module.

12. The method according to claim 1, wherein the processing device is a programmable micro processor.

13. The method according to claim 1, wherein the processing device is a mobile terminal.

14. The method according to claim 1, wherein the storage medium is included in the processing device.

15. The method according to claim 1, wherein the counter is a software version counter.

16. The method according to claim 1, further comprising the steps of:
    receiving an updated version of said memory content, the updated version including a version indicator;
    verifying the authenticity of the received memory content;

performing a version control of the received updated memory content based on the version indicator and the current value of the version counter; and accepting the received updated memory content conditioned on a result of the version control.

17. The method according to claim 16, further comprising incrementing the version counter to a subsequent counter value corresponding to the version indicator of the received updated memory content.

18. The method according to claim 1, wherein accepting comprises the step of updating memory content stored in the processing device with the accepted received updated memory content.

19. The method of claim 1, said steps being performed by a computer program product comprising program code means embodied on a non-transitory computer readable medium adapted to be executed on a data processing device.

20. A processing device configured to maintain a version counter indicative of a version of a memory content stored in said processing device, comprising:

a unit being selectively operable in one of a first and second mode, wherein access to operating the processing device in the first mode is limited to authorized users and controlled separately from access to the second mode;

wherein the processing device is configured to, when operated in the first mode:

generate at least an initial counter value of said version counter, wherein the initial counter value is selected from a sequence of counter values;

generate an initial reference integrity protection value for cryptographically protecting the integrity of the generated initial counter value during operation of the processing device in the second mode; and store the initial reference integrity protection value as a current reference integrity protection value in a storage medium;

wherein the processing device is configured to restrict the output of reference integrity protection values of at least the current and earlier counter values of said sequence of counter values to the first mode; and wherein the processing device is further configured to:

verify the integrity of a current counter value based on the current reference integrity protection value;

increment a current counter value to a subsequent counter value, when operated in the second mode, the subsequent counter value being subsequent to the current counter value in the sequence of counter values;

wherein the increment includes removing the current reference integrity protection value for cryptographically protecting the integrity of the current counter value from said storage medium.

21. The processing device according to claim 20, configured to, when operated in the first mode:

generate a sequence of counter values; wherein the sequence of counter values is sequentially ordered starting from said initial counter value;

generate a corresponding sequence of reference integrity protection values for cryptographically protecting the integrity of respective ones of the generated sequence of counter values; and store the sequence of reference integrity protection values in a storage medium.

22. The processing device according to claim 21, comprising an integrity protection value calculation unit adapted to output a generated reference integrity protection value of said sequence of reference integrity protection values only when the device is operated in the first one of said first and second modes.

23. The processing device according to claim 20, adapted to increment the current counter value to a subsequent counter value by generating a subsequent reference integrity protection value corresponding to the subsequent counter value and by replacing the current reference integrity protection value with the subsequent reference integrity protection value.

24. The processing device according to claim 23, further adapted to verify the current counter value by means of the current reference integrity protection value; and to generate said subsequent reference integrity protection value conditioned on a successful verification of said current counter value.

25. The processing device according to claim 20, adapted to generate each reference integrity protection value as to be unique for the corresponding counter value and the device.

26. The processing device according to claim 20, adapted to generate each reference integrity protection value as a message authentication code value generated by a message authentication code function from a value of said version counter and a secret key value.

27. The processing device according to claim 26, wherein the secret key value is device specific.

28. The processing device according to claim 20, wherein each of the counter values is device unique.

29. The processing device according to claim 20, comprising an integrity protection module adapted to implement the generation and verification of the counter values by means of the corresponding reference integrity protection values; and wherein the integrity protection module is secured against modification.

30. The processing device according to claim 29, wherein the integrity protection module is a hardware module.

31. The processing device according claim 20, wherein the processing device is a programmable micro processor.

32. The processing device according to claim 20, wherein the processing device is a mobile terminal.

33. The processing device according to claim 20, wherein the processing device includes the storage medium.

34. The processing device according to claim 20, wherein the counter is a software version counter.

* * * * *